(12) United States Patent
Wang et al.

(10) Patent No.: US 9,628,967 B2
(45) Date of Patent: Apr. 18, 2017

(54) METHOD AND DEVICE FOR GENERATING PROMPT MESSAGE

(71) Applicant: Xiaomi Inc., Beijing (CN)

(72) Inventors: Yang Wang, Beijing (CN); Qiang Fu, Beijing (CN); Enxing Hou, Beijing (CN)

(73) Assignee: Xiaomi Inc., Beijing (CN)

( * ) Notice: Subject to any disclaimer, the term of this patent is extended or adjusted under 35 U.S.C. 154(b) by 0 days.

(21) Appl. No.: 14/995,498

(22) Filed: Jan. 14, 2016

(65) Prior Publication Data

US 2016/0212598 A1    Jul. 21, 2016

(30) Foreign Application Priority Data

Jan. 15, 2015 (CN) .......................... 2015 1 0020696
Jan. 29, 2015 (CN) .......................... 2015 1 0046469

(51) Int. Cl.

| | |
|---|---|
| *H04M 1/725* | (2006.01) |
| *H04W 4/12* | (2009.01) |
| *H04W 4/02* | (2009.01) |
| *H04L 12/28* | (2006.01) |
| *H04L 12/64* | (2006.01) |

(52) U.S. Cl.
CPC ........... *H04W 4/12* (2013.01); *H04L 12/2809* (2013.01); *H04L 12/2816* (2013.01); *H04L 12/2823* (2013.01); *H04L 12/6418* (2013.01); *H04W 4/021* (2013.01); *H04L 2012/284* (2013.01); *H04L 2012/285* (2013.01); *H04W 4/02* (2013.01)

(58) Field of Classification Search
CPC ......... H04W 4/12; H04W 4/021; H04W 4/02; H04L 12/2809; H04L 12/2816; H04L 12/2823; H04L 12/6418; H04L 2012/284; H04L 2012/285

USPC .................................. 455/435.1, 566, 412.2
See application file for complete search history.

(56) References Cited

U.S. PATENT DOCUMENTS

2012/0077493 A1* 3/2012 Robbins ................ H04W 4/021
455/435.1

FOREIGN PATENT DOCUMENTS

| CN | 201381735 Y | 1/2010 | |
|---|---|---|---|
| CN | 103528167 * | 1/2014 | ............. H04W 4/00 |
| CN | 103528167 A | 1/2014 | |
| WO | WO 99/02987 | 1/1999 | |

OTHER PUBLICATIONS

English translation.*
Extended European Search Report for European Application No. 16151163.9, dated May 12, 2016 (7 pages).

* cited by examiner

*Primary Examiner* — Charles Shedrick
(74) *Attorney, Agent, or Firm* — Finnegan, Henderson, Farabow, Garrett & Dunner LLP

(57) ABSTRACT

A method for generating a prompt message is provided. The method includes: acquiring information about an opened-or-closed state of a door or window, the information about the opened-or-closed state of a door or window indicating whether the door or window is in an opened or closed state; acquiring information about indoor and outdoor environments; and generating a prompt message according to the information about the opened-or-closed state of the door or window and the information about the indoor and outdoor environments.

14 Claims, 11 Drawing Sheets

METHOD AND DEVICE FOR GENERATING PROMPT MESSAGE

CROSS-REFERENCE TO RELATED APPLICATIONS

This application is based upon and claims priority to Chinese Patent Application No. 201510046469.3 filed on Jan. 29, 2015, and Chinese Patent Application No. 201510020696.9 filed on Jan. 15, 2015, the disclosure of all of which are incorporated herein by reference in their entireties.

TECHNICAL FIELD

The disclosure generally relates to the field of smart home, and in particular to a method and device for generating a prompt message.

BACKGROUND

A user usually allows indoor and outdoor air to circulate by opening doors and windows daily to thereby refresh the indoor air.

However, the user may forget to open or close the doors or the windows and cannot judge exactly the difference between indoor air quality and outdoor air quality. So when the doors and windows are opened or closed unreasonably, the indoor air condition may be poor, which affects the health of user.

SUMMARY

According to a first aspect of the present disclosure, there is provided a method for generating a prompt message. The method includes: acquiring information about an opened-or-closed state of a door or window, the information about the opened-or-closed state of a door or window indicating whether the door or window is in an opened or closed state; acquiring information about indoor and outdoor environments; and generating a prompt message according to the information about the opened-or-closed state of the door or window and the information about the indoor and outdoor environments.

According to another aspect of the present disclosure, there is provided a device for generating a prompt message. The device includes a processor; and a memory for storing instructions executable by the processor. The processor is configured to: acquire information about an opened-or-closed state of a door or window, the information about the opened-or-closed state of a door or window indicating whether the door or window is in an opened or closed state; acquire information about indoor and outdoor environments; and generate a prompt message according to the information about the opened-or-closed state of the door or window and the information about the indoor and outdoor environments.

According to another aspect of the present disclosure, there is provided a non-transitory computer-readable storage medium having stored therein instructions that, when executed by a processor, causes the processor to perform a method for generating a prompt message. The method includes: acquiring information about an opened-or-closed state of a door or window, the information about the opened-or-closed state of a door or window indicating whether the door or window is in an opened or closed state; acquiring information about indoor and outdoor environments; and generating a prompt message according to the information about the opened-or-closed state of the door or window and the information about the indoor and outdoor environments.

It is to be understood that both the foregoing general description and the following detailed description are exemplary and explanatory only and are not restrictive of the invention, as claimed.

BRIEF DESCRIPTION OF THE DRAWINGS

The accompanying drawings, which are incorporated in and constitute a part of this specification, illustrate embodiments consistent with the disclosure and, together with the description, serve to explain the principles of the disclosure.

The specific embodiments of the disclosure are shown through the accompanying drawings, and more detailed description will be given hereinafter. These accompanying drawings and text description do not limit the scope of conception of the disclosure in any way, but illustrate concepts of the disclosure for the skilled personnel in the field by referring to particular embodiments.

DETAILED DESCRIPTION

Reference will now be made in detail to exemplary embodiments, examples of which are illustrated in the accompanying drawings. The following description refers to the accompanying drawings in which the same numbers in different drawings represent the same or similar elements unless otherwise represented. The implementations set forth in the following description of exemplary embodiments do not represent all implementations consistent with the disclosure. Instead, they are merely examples of devices and methods consistent with aspects related to the invention as recited in the appended claims.

Figure 1:
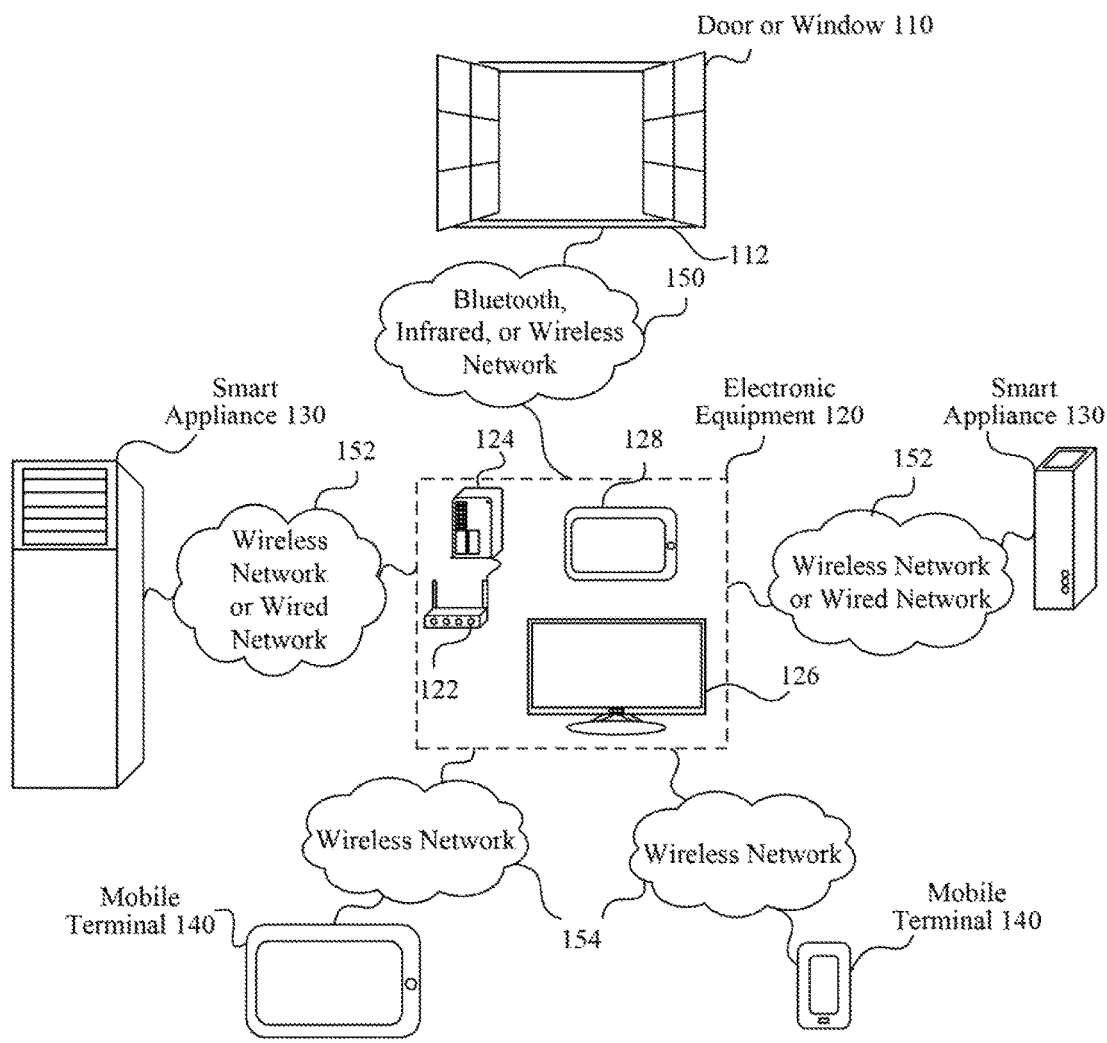
FIG. 1 is a schematic diagram showing an exemplary system 100 for generating and sending prompt messages consistent with embodiments of the present disclosure.

FIG. 1 is a schematic diagram showing an exemplary system 100 for generating and sending prompt messages consistent with embodiments of the present disclosure. The system 100 includes one or more doors or windows 110, electronic equipment 120, one or more smart appliances 130, and one or more mobile terminals 140.

A control chip and a mechanical control unit 112, are equipped in the door or window 110 for controlling the door or window 110 to open or close, and are coupled with the electronic equipment 120 through a wireless means, such as Bluetooth, infrared, or a wireless network. The door or window 110 in the embodiments of the disclosure includes a door, or a window, or a combination of one or more doors and windows.

The electronic equipment 120, which has a processing function, may be a residential gateway, a server coupled with the residential gateway, a smart appliance, or a piece of mobile equipment at home. The residential gateway may be an intelligent router. The smart appliance may be a smart television or a smart set top box, and so on. The mobile equipment at home may be a tablet computer or laptop computer, and so on. As shown in FIG. 1, the electronic equipment 120 may be any one or more of an intelligent router 122, a server 124 connected with the intelligent router 122, a smart television 126, and a tablet computer 128.

The electronic equipment 120 is coupled with the smart appliance 130 through a wired or wireless network 152.

The smart appliance 130 may be, for example, an intelligent air purifier, an intelligent air conditioner, a piece of intelligent gas equipment, or an intelligent floor heating system, and so on.

The electronic equipment 120 is coupled with the mobile terminal 140 through a wireless network 154.

The mobile terminal 140 may be a piece of portable intelligent equipment, such as a smart phone or the tablet computer, and so on.

For purpose of explaining the present disclosure, the following embodiments are illustrated by using the intelligent router 122 as exemplary electronic equipment 120. But the present disclosure is not so limited.

Figure 2:
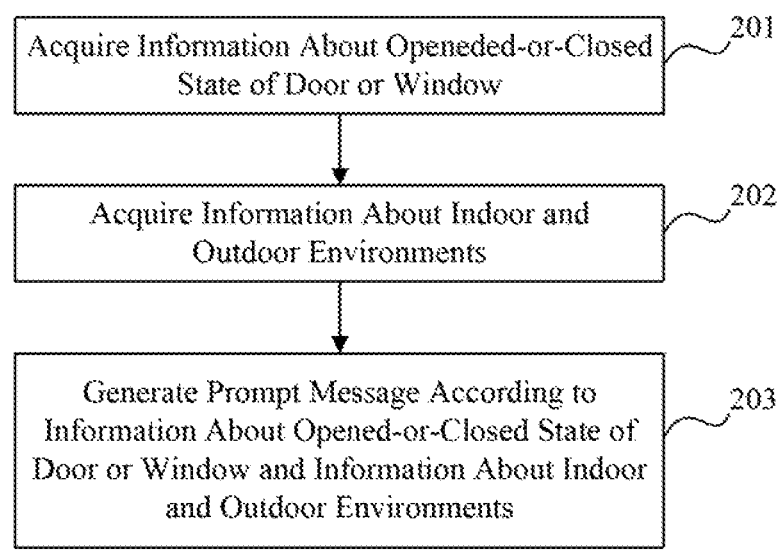
FIG. 2 is a flowchart of a method for generating a prompt message according to an exemplary embodiment of the present disclosure.

FIG. 2 is a flowchart of a method 200 for generating a prompt message according to an exemplary embodiment. In the illustrated embodiment, the method 200 for generating a prompt message is performed by the electronic equipment 120 in FIG. 1, and may include the following steps.

In step 201, information about an opened-or-closed state of a door or window is acquired. The information about the opened-or-closed state of a door or window indicates whether the door or window is in an opened or closed state.

The information about an opened-or-closed state of a door or window may include at least one of the following: whether the door or window is open, the manner by which the door or window is opened, or an open angle of the door or window.

In step 202, information about indoor and outdoor environments is acquired.

The information about indoor and outdoor environments may include: information about weather condition, information about indoor environment quality, information about outdoor environment quality, information about indoor humidity, information about harmful gas content, and information of a specified device in a working state, and so on.

The information about indoor environment quality may include an indoor environment index which is calculated according to an indoor air condition. The information about outdoor environment quality is an outdoor environment index which is calculated according to an outdoor air condition.

The specified device may include: an air purifier, a refrigerating unit, a heating unit, or other smart appliances.

In step 203, a prompt message is generated according to the information about the opened-or-closed state of the door or window and the information about the indoor and outdoor environments.

In the illustrated embodiment, the method 200 includes acquiring the information about the opened-or-closed state of the door or window, acquiring the information about indoor and outdoor environments, and generating the prompt message according to the information about the opened-or-closed state of the door or window and the information about the indoor and outdoor environments. As noted above, when the door or window are opened or closed unreasonably, an indoor air condition may become poor, which affects the health of user. The embodiments of the present disclosure can send a prompt message to the user to reasonably open or close the door or window according to the condition of indoor and outdoor environments, thereby not only improving the indoor air quality, but also preventing theft and protecting the security of user.

Figure 3A:
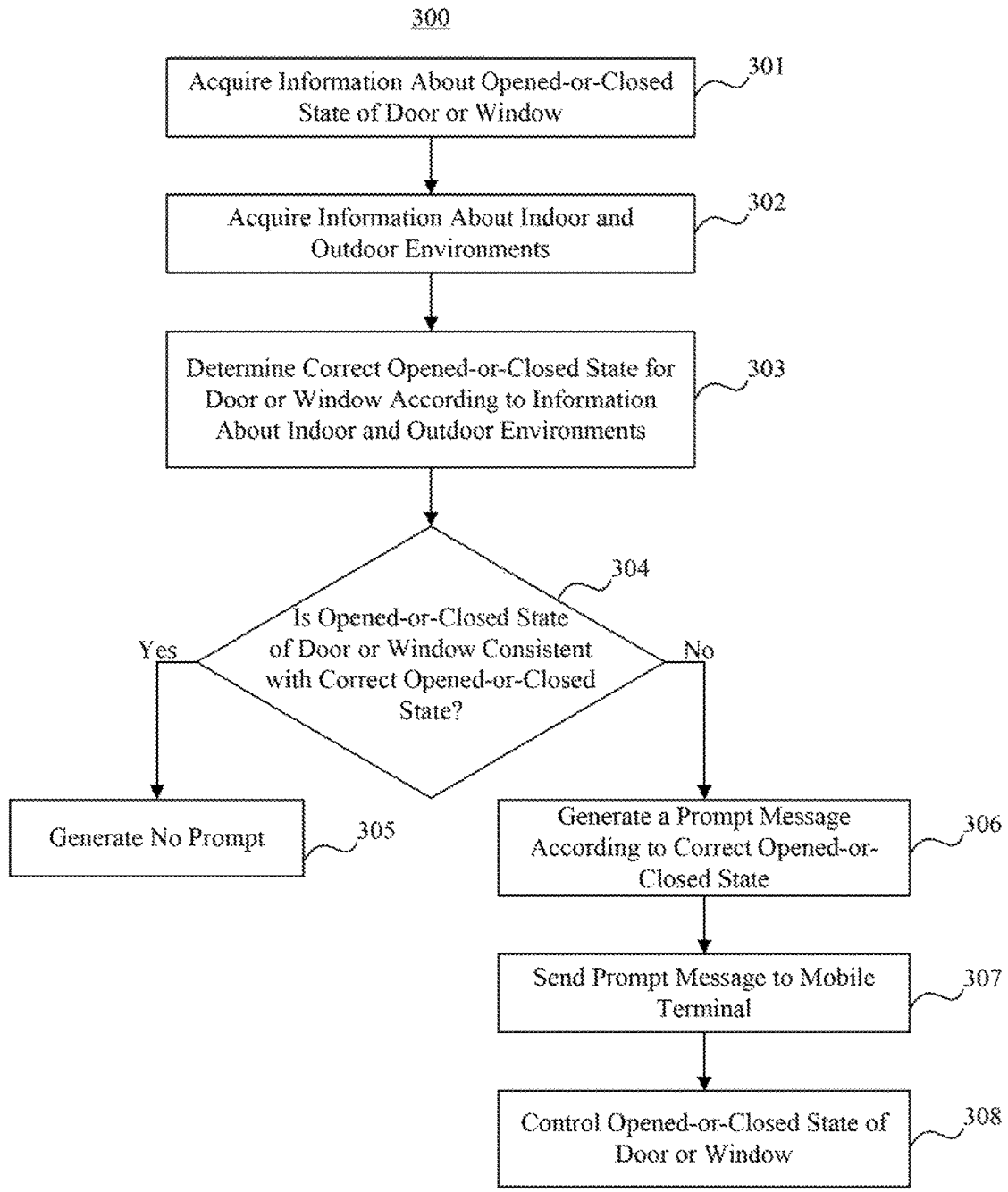
FIG. 3A is a flowchart of a method for generating and sending a prompt message to a mobile terminal according to another exemplary embodiment of the present disclosure.

FIG. 3A is a flowchart of a method 300 for generating and seconding a prompt message to a mobile terminal of a user, according to another exemplary embodiment. The method 300 is performed by the electronic equipment 120 in FIG. 1. For purpose of explaining this disclosure, the following embodiment is illustrated by using the intelligent router 122 as the electronic equipment 120. Referring to FIGS. 1 and 3A, the method 300 may include the following steps.

In step 301, information about an open-or-closed state of a door or window 110 is acquired. The information about the opened-or-closed state of a door or window 110 indicates whether the door or window 110 is in an opened or closed state.

In some embodiments, a sensor may be pre-installed on the door or window 110. The sensor may be an infrared distance sensor or a mechanical sensor installed on, for example, the frame of the door or window 110. The sensor is configured to acquire the information about the opened-or-closed state of the door or window 110. The information about the opened-or-closed state of the door or window 110 may include at least one of the following: whether the door or window 110 is open, the manner by which the door or window 110 is opened, and the open angle of the door or window 110. The manner by which the door or window 110 is opened may include that the door or window 110 is opened by sliding horizontally, hanging vertically, a push-and-pull mechanism, and so on.

For example, the sensor on the door or window 110 can determine whether the door/window 110 is open by detecting whether the door/window 110 is separated from the frame. Furthermore, the sensor can also calculate the open angle of the door or window 110 by acquiring a distance between the door (or window) 110 and the frame.

The sensor may be coupled to the electronic equipment 120 through the Bluetooth, the infrared or the wireless network 150. For example, when the electronic equipment 120 is the intelligent router 122, the sensor can be coupled to the intelligent router 122 through the wireless network 150 and send the acquired information about the opened-or-closed state of a door or window to the intelligent router 122. The intelligent router 122 receives the information about the opened-or-closed state of a door or window from the sensor 112.

In step 302, the information about indoor and outdoor environments is acquired.

The information about indoor and outdoor environments may include: the information about weather condition, the information about indoor environment quality, the information about outdoor environment quality, the information about indoor humidity, the information about harmful gas content, information of a specified device in a working state, and so on.

The specified device may be a smart appliance coupled with the intelligent router 122. The specified device sends its working state information to the intelligent router 122, for example, when its working state changes. The specified device may be an air purifier, a refrigerating unit, a heating unit, or other smart appliances.

The intelligent router 122 may acquire the information about weather condition and the information about outdoor environment quality by looking up on the Internet. The intelligent router 122 is also connected with the smart appliance 130 at home through the wired or wireless network 152, and receives the information about indoor environment quality, the information about indoor humidity, the information about harmful gas content, and/or the working state information of the specified device sent by the smart appliance 130.

For example, the air purifier at home may be coupled with the intelligent router 122, and send the acquired information about indoor environment quality, information about indoor humidity, and/or information about harmful gas content to the intelligent router 122.

For example, the intelligent floor heating system at home may be coupled with the intelligent router 122. The intelligent floor heating system may report its working state information to the intelligent router 122.

In step 303, a correct opened-or-closed state for the door or window 110 is determined according to the information about indoor and outdoor environments.

The outdoor environment quality may be poorer than the indoor environment quality. Under the circumstance, when the door or window 110 is opened, indoor air may be polluted. Thus, the intelligent router 122 is configured to estimate the indoor environment quality and the outdoor environment quality according to the acquired information about indoor and outdoor environments, and further determine a correct opened-or-closed state for the door or window 110.

Figure 3B:
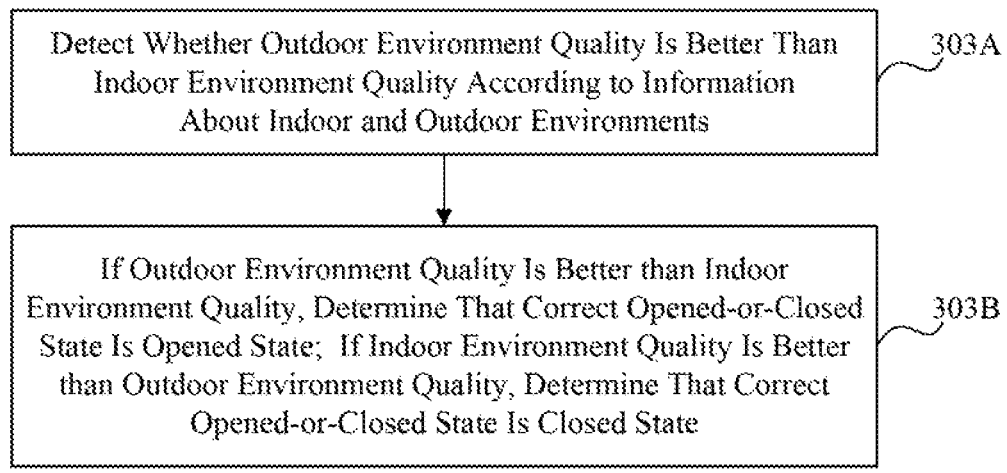
FIG. 3B is a flowchart showing further details of the method illustrated in FIG. 3A.

In some embodiments, as shown in FIG. 3B, step 303 may include the following steps.

In step 303A, it is detected that whether the outdoor environment quality is better than the indoor environment quality according to the information about indoor and outdoor environments.

The intelligent router 122 acquires the information about indoor environment quality from the information about indoor environment, and the information about outdoor environment quality from the information about outdoor environment, and detects whether the outdoor environment quality is better than the indoor environment quality according to the information about indoor environment quality and the information about outdoor environment quality.

For example, the information about indoor environment quality and the information about outdoor environment quality are environmental pollution indexes calculated according to pollutant content of the indoor and outdoor air, respectively. The higher the environment pollution index is, the poorer the environment quality is. The intelligent router 122 detects whether the outdoor environment quality is better than the indoor environment quality by comparing the environment pollution indexes.

In step 303B, if the outdoor environment quality is better than the indoor environment quality, then it is determined that the correct opened-or-closed state is an opened state, that is, the door or window should be opened. If the indoor environment quality is better than the outdoor environment quality, then it is determined that the correct opened-or-closed state is a closed state, that is, the door or window should be closed.

When it is detected that an environment quality index corresponding to the information about indoor environment quality is greater than the environment quality index corresponding to the information about outdoor environment quality, namely, the current outdoor environment is better than the current indoor environment, opening the door or window for ventilation can improve the indoor air quality. The intelligent router 122 determines that the correct opened-or-closed state is an opened state. When it is detected that the environment quality index corresponding to the information about indoor environment quality is less than the environment quality index corresponding to the information about outdoor environment quality, namely, the current indoor environment is better than the current outdoor environment, opening the door or window for ventilation will cause indoor air to become polluted. The intelligent router 122 determines that the correct opened-or-closed state is a closed state.

When it is raining, the outdoor environment quality may be better than the indoor environment quality, but opening the door or window 110 may cause rainwater to enter the house. In some embodiment, the intelligent router 122 is configured to further detect whether it is right to open the door/window 110 according to, for example, weather forecast information in the information about indoor and outdoor environments. In some embodiment, when it is detected that it is raining or about to rain, the intelligent router 122 may determine the closed state as the correct opened-or-closed state, despite the outdoor environment quality is better than the indoor environment quality.

In step 304, it is detected that whether the opened-or-closed state of the door or window 110 is consistent with the correct opened-or-closed state.

After determining the correct opened-or-closed state, the intelligent router 122 detects whether the current opened-or-closed state of the door or window 110 is consistent with the determined correct opened-or-closed state. When it is detected that they are consistent, the method 300 proceeds to step 305. In one embodiment, they are consistent when both indicate the door or window is opened or closed, regardless the open angle of the door or window. In another embodiment, they are consistent when both indicate the door or window is opened to a same open angle or with a degree of angle variation. In one embodiment, they are consistent when both indicate the door or window is opened or closed in the same manner, such as the door or window is slide-open. In one embodiment, they are consistent when they are identical to each other. When it is detected that they are different or inconsistent, the method 300 proceeds to step 306. Examples of difference or inconsistence may be those opposite to the embodiments explained above.

In step 305, if the opened-or-closed state of the door or window is consistent with the correct opened-or-closed state, no prompt message is generated.

In step 306, if the opened-or-closed state of the door or window is different from the correct opened-or-closed state, the prompt message is generated according to the correct opened-or-closed state.

When it is detected that the current opened-or-closed state of the door or window 110 is different from the correct opened-or-closed state, the intelligent router 122 generates the prompt message according to the correct opened-or-closed state. The prompt message is used for reminding the user to open or close the door/window 110.

In step 307, the prompt message is sent to the mobile terminal 140 associated with the user.

Figure 3C:
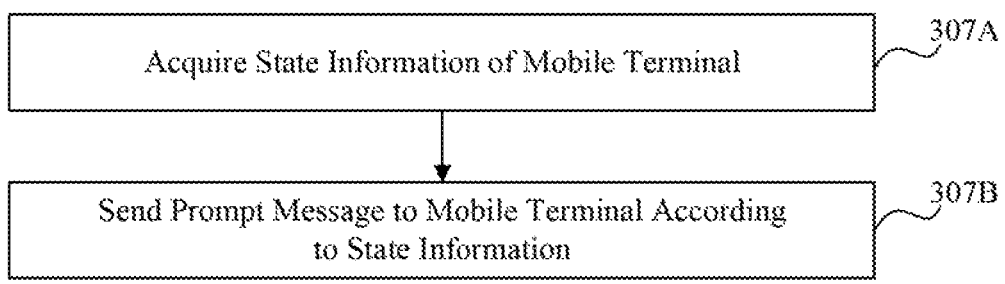
FIG. 3C is a flowchart showing further details of the method illustrated in FIG. 3A.

To prompt the user to open or close the door/window 110 according to the prompt message, the intelligent router 122 sends the prompt message to the mobile terminal 140 which is coupled to the intelligent router 122. As shown in FIG. 3C, step 307 may include the following steps.

In step 307A, state information of the mobile terminal 140 is acquired. The state information may include at least one of the following: information about an on-or-off state of the mobile terminal 140 and information about geographic location of the mobile terminal 140.

For enabling the user to receive the prompt message in time, the intelligent router 122 may further acquire the state information of the mobile terminal 140. The state information includes the information about an on-or-off state of the mobile terminal 140 and the information about geographic location of the mobile terminal 140, and so on. The intelligent router 122 selects the mobile terminal 140 which is able to receive the prompt message as the target mobile terminal according to the acquired state information.

In step 307B, the prompt message is sent to the target mobile terminal 140 according to the state information.

The intelligent router 122 sends the prompt message to the target mobile terminal which is able to receive the prompt message. The prompt message may be text information or voice information, and so on. The form or content of the prompt message is not limited in the present disclosure.

Referring back to FIG. 3A, in step 308, the opened-or-closed state of the door or window is controlled.

Figure 3D:
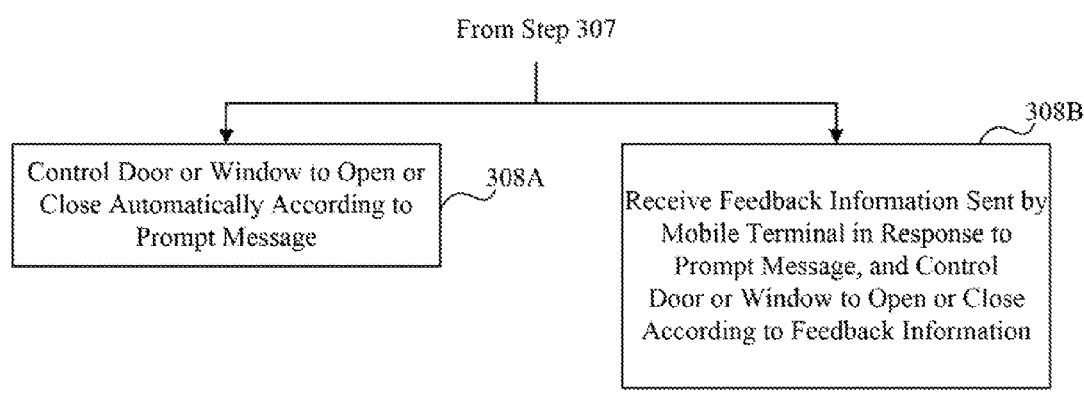
FIG. 3D is a flowchart showing further details of the method illustrated in FIG. 3A.

After receiving the prompt message through the mobile terminal 140, the user can send the feedback information to the intelligent router 122. The intelligent router 122 controls the door/window 110 to open or close according to the feedback information. In some embodiments, the user may not view the prompt message or return the feedback information in time. The intelligent router 122 may automatically control the door/window to open or close according to the prompt message if it does not receive feedback information after a pre-determined time period from the prompt message is sent lapses. As shown in FIG. 3D, step 308 may include the following steps.

In step 308A, the door or window 110 is controlled to open or close automatically according to the prompt message.

In some embodiments, after sending the prompt message to the mobile terminal 140, the intelligent router 122 starts a timer, and detects in a preset time span whether the feedback information sent by the mobile terminal 140 is received. When the feedback information is not received within the preset time span, the intelligent router 122 automatically controls the door or window to open or close according to the prompt message. When the intelligent router 122 detects that the harmful outdoor gas content is greater than the preset threshold, it can automatically control to close the door or window 110 without receiving the feedback information of the user.

In step 308B, when it is received the feedback information sent by the mobile terminal 140 in response to the prompt message, the door or window 110 is controlled to open or close according to the feedback information.

In some embodiments, after sending the prompt message to the mobile terminal, the intelligent router 122 starts the timer, and detects in the preset time span whether the feedback information sent by the mobile terminal 140 is received. When the feedback information is received in the preset time span, the intelligent router 122 controls the door or window 110 to open or close according to the feedback information.

Figure 3E:
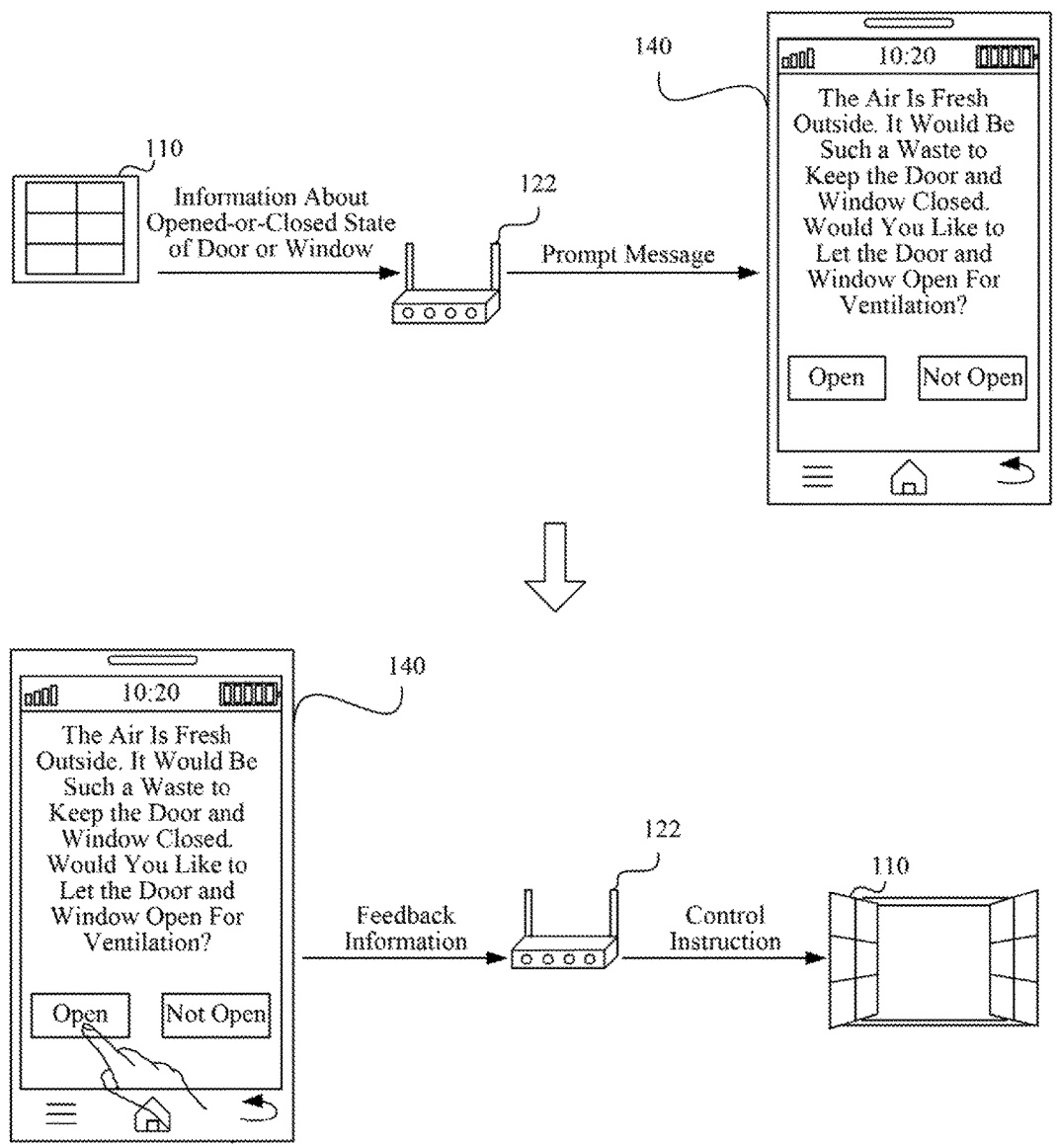
FIG. 3E is a diagram showing further details of the method illustrated in FIG. 3A.

For example, as shown in FIG. 3E, the door or window 110 sends the current information about opened-or-closed state of the door or window 110 to the intelligent router 122. The intelligent router 122 generates the prompt message according to the information about opened-or-closed state of the door or window 110, and sends the prompt message to the mobile terminal 140 to remind the user to open the door or window 110. Then, the user selects to open the door or window 110 according to the prompt message. The mobile terminal 140 sends the feedback information to the intelligent router 122 according to the selection of the user. The intelligent router 122 sends a control instruction to the door or window 110 according to the feedback information to control the door or window 110 to, for example, open.

In the illustrated embodiment, the method 300 includes acquiring the information about the open-or-closed state of the door or window, acquiring the information about indoor and outdoor environments, and generating the prompt message according to the information about the open-or-closed state of the door or window and the information about the indoor and outdoor environments. As explained above, when the door or window are opened or closed unreasonably, an indoor air condition becomes poor, which affects the health of user. The embodiments of the present disclosure can remind the user to reasonably open or close the door or window according to the condition of indoor and outdoor environments, thereby not only improving the indoor air quality, but also preventing theft and protecting the security of user.

The method 300 includes detecting whether the outdoor environment quality is better than the indoor environment quality, reminding the user to open the door or window when the outdoor environment quality is better than the indoor environment quality, and reminding the user to close the door or window when the indoor environment quality is better than the outdoor environment quality. The method 300 may prevent that when the outdoor environment is relatively bad, the indoor environment is polluted because of opening the door or window by the user, and improve the accuracy of the prompt message.

Figure 3F:
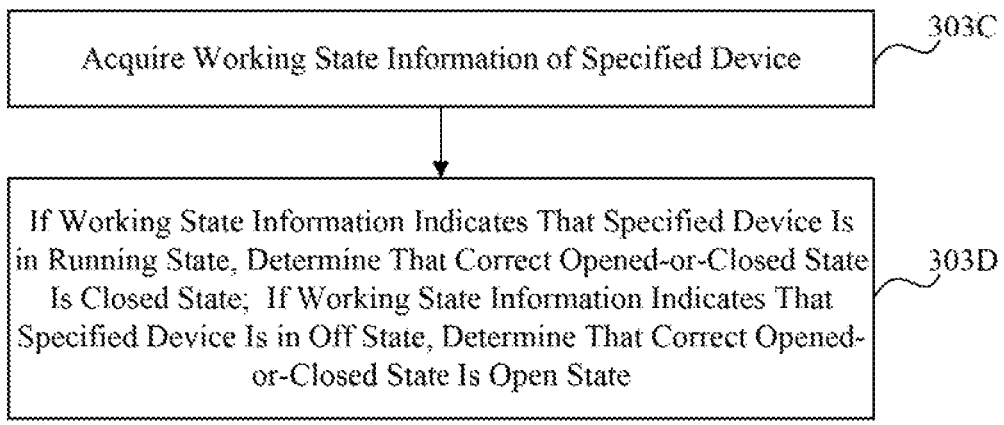
FIG. 3F is a flowchart showing further details of the method illustrated in FIG. 3A.

When the user is using an air purifier or other home appliances, opening the door or window 110 will cause the problem that the home appliances cannot achieve the desired work efficiency. The intelligent router 122 may also determine the correct opened-or-closed state for the door or window according to the working state information of a specified device. In some embodiments, as shown in FIG. 3F, the step 303 may further include step 303C and step 303D.

In step 303C, information of a specified device in a working state is acquired, which may be included in the information about indoor and outdoor environments.

The specified device at home is coupled with the intelligent router 122. When the working state of the specified device changes, the specified device reports its current working state information to the intelligent router 122.

For example, when the air purifier is started, it sends its working state information to the intelligent router 122. The working state information is used for informing the intelligent router 122 that the air purifier is working.

In step 303D, if the working state information indicates that the specified device is in the running state, then it is determined that the correct opened-or-closed state of the door or window 110 is a closed state. If the working state information indicates that the specified device is in an off state, then it is determined that the correct opened-or-closed state is an opened state. The specified device may include an air purifier, a refrigerating unit, or a heating unit.

When the intelligent router 122 determines according to the working state information that the specified device is running, to ensure good working efficiency of the specified device, it is determined that the correct opened-or-closed state is a closed state. When the intelligent router 122 determines according to the working state information that the specified device is not running, it is determined that the correct opened-or-closed state is an opened state.

In some embodiments, the specified device may burn gas and generate harmful gas exhaust when it is running. To protect the health of user, the intelligent router 122 determines that the correct opened-or-closed state should be an opened state when detecting that a gas-burning device is running.

In the illustrated embodiments, whether the door or window 110 needs to be opened is determined according to the working state of the specified device. The method 300 avoids the problem that when the user is using the specified device, the power resource is wasted because of an opening door or window that reduces the working efficiency of the specified device. This could maximize the working efficiency of the specified device and save the power resource.

Figure 3G:
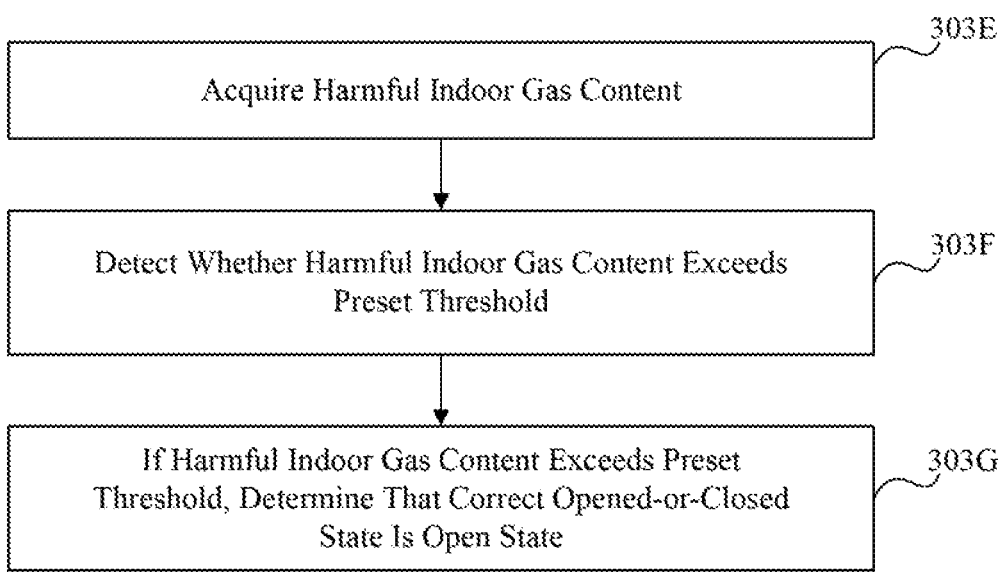
FIG. 3G is a flowchart showing further details of the method illustrated in FIG. 3A.

In some embodiments, the intelligent router 122 may also determine to open or close the door or window 110 according to information of the harmful indoor gas content. As shown in FIG. 3G step 303 may further include steps 303E, 303F, and 303G.

In step 303E, the information of harmful indoor gas content which is included in the information about the indoor and outdoor environments is acquired.

The intelligent router 122 acquires the information of harmful indoor gas content which is included in the information about the indoor and outdoor environments. The harmful indoor gas content may be acquired through the air purifier or other equipment.

In step 303F, it is detected that whether the harmful indoor gas content exceeds a preset threshold.

In step 303G if the harmful indoor gas content exceeds the preset threshold, it is determined that the correct opened-or-closed state should be an opened state.

When the harmful indoor gas content exceeds the preset threshold, the indoor air is harmful to the health of the user. The intelligent router 122 determines that the correct opened-or-closed state of the door or window 110 should be an opened state.

In the illustrated embodiment, the method 300 further includes determining whether the harmful indoor gas content exceeds the preset threshold and reminding the user to open the door or window 110 when the harmful indoor gas content exceeds the preset threshold. This can keep the indoor air in good quality.

Figure 3H:
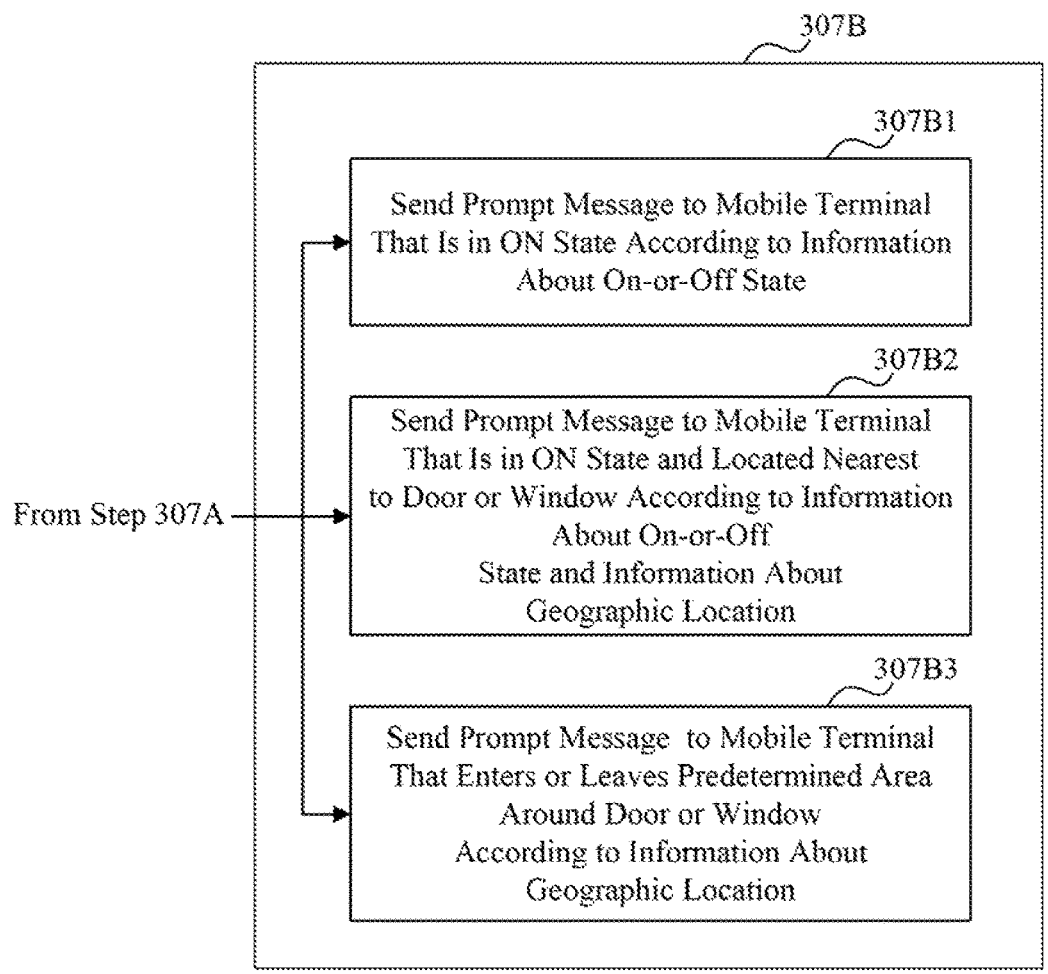
FIG. 3H is a flowchart showing further details of the method illustrated in FIG. 3A.

To enable the user to receive the prompt message in time, as shown in FIG. 3H, the step 307B as shown in FIG. 3C may be one of step 307B1, step 307B2, or step 307B3.

In step 307B1, the prompt message is sent to the mobile terminal 140 that is in the on state according to the information about the on-or-off state.

A user may employ several mobile terminals, but turn on one or more of them at the time intelligent router 122 obtains their working states. The intelligent router 122 acquires information indicating the mobile terminal 140 is in the on state, and sends the prompt message to the mobile terminal 140 that is in the on state.

In step 307B2, the prompt message is sent to the mobile terminal 140 that is in the on state and is located the nearest to the door or window 110, according to the information about the on-or-off state and the information about the geographic location of the mobile terminal 140.

To make the door or window open or close in time, the intelligent router 122 determines a mobile terminal 140 that is located the nearest to the door or window 110 as the target mobile terminal according to the information about geographic location of the mobile terminal 140 and that is in the on state, and sends the prompt message to the target mobile terminal.

In step 307B3, the prompt message is sent, according to the information about geographic location, to the mobile terminal 140 that enters or leaves a predetermined area around the door or window 110.

For example, when the intelligent router 122 detects that a mobile terminal is connected to it, it can be determined that the mobile terminal has entered the predetermined area around the door or window 110. When the intelligent router 122 detects that a mobile terminal gets disconnected with it, the intelligent router 122 further acquires the information about geographic location of the mobile terminal 140. When the information about geographic location indicates that the mobile terminal 140 is far from the intelligent router 122, it can be determined that the mobile terminal 140 leaves the predetermined area around the door or window.

For example, when the intelligent router 122 determines that the door or window 110 needs to be closed, and detects that there is a mobile terminal connected to the intelligent router 122, the intelligent router 122 can determine that the mobile terminal is the one having entered the predetermined area around the door or window 110, and sends the prompt message to the mobile terminal.

In the illustrated embodiments, the prompt message is sent to the mobile terminal that is in the on state, or the mobile terminal that is in the on state and located the nearest to the door or window to remind the user in time to open or close the door or window.

The following are embodiments of exemplary devices consistent with embodiments of the present disclosure, which can be used for implementing the embodiments of the methods 200 and 300 explained above. The detail functions of the exemplary devices, if not discussed herein, may be found in the description of the methods 200 and 300.

Figure 4:
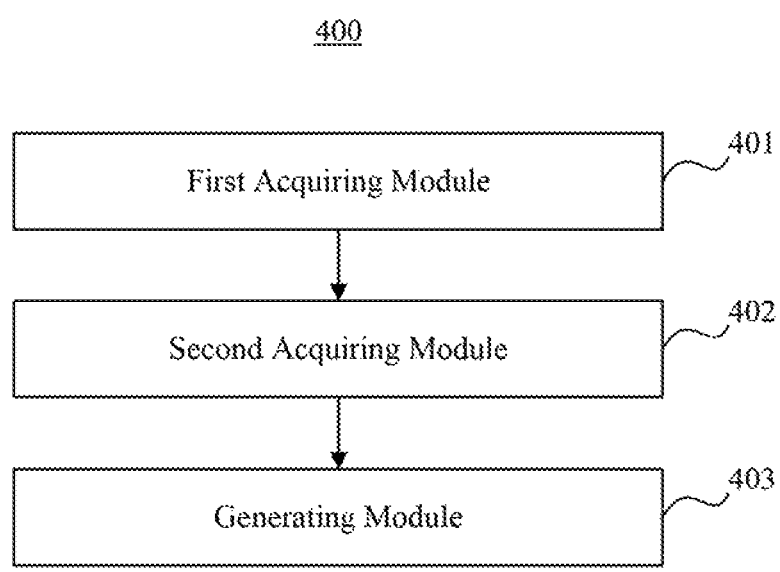
FIG. 4 is a block diagram of a device for generating a prompt message according to an exemplary embodiment of the present disclosure.

FIG. 4 is a block diagram of a device 400 for generating a prompt message according to an exemplary embodiment. The device 400 for generating a prompt message may be a portion or all of the electronic equipment 120 as shown in FIG. 1. The device 400 for generating a prompt message may include a first acquiring module 401, a second acquiring module 402, and a generating module 403.

The first acquiring module 401 is configured to acquire information about an opened-or-closed state of a door or window.

The second acquiring module 402 is configured to acquire information about indoor and outdoor environments.

The generating module 403 is configured to generate a prompt message according to the information about the opened-or-closed state of the door or window and the information about the indoor and outdoor environments.

In some embodiments, these modules may be implemented through software, or hardware, or a combination of them.

In the illustrated embodiment, the device 400 acquire the information about the opened-or-closed state of the door or window, acquires the information about indoor and outdoor environments, and generates the prompt message according to the information about the opened-or-closed state of the door or window and the information about the indoor and outdoor environments. As explained above, when the door or window are opened or closed unreasonably, an indoor air condition may become poor, which affects the health of user. The embodiments of the present disclosure can remind the user to reasonably open or close the door or window according to the condition of indoor and outdoor environments, thereby not only improving the indoor air quality, but also preventing theft and protecting the security of user.

Figure 5:
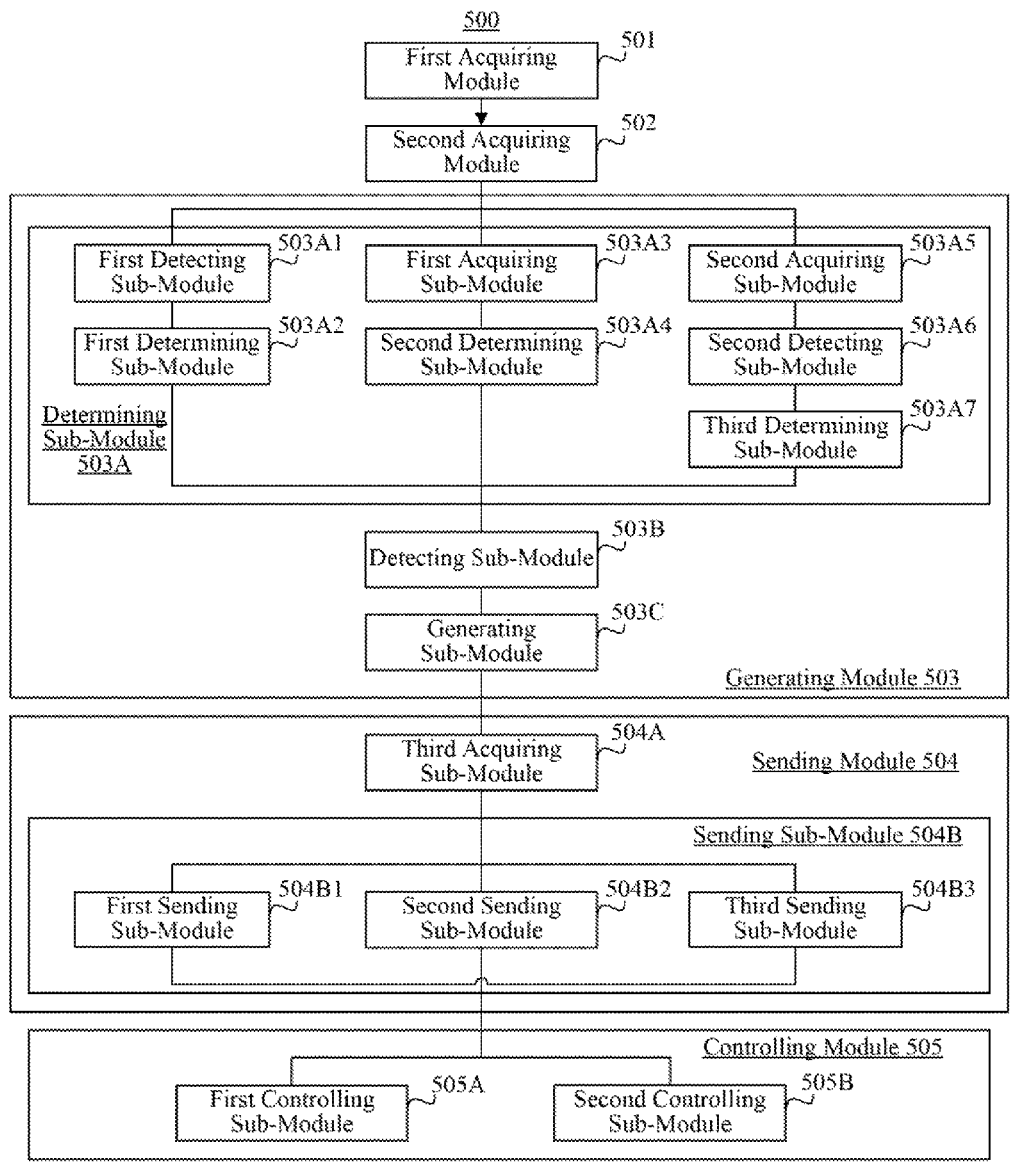
FIG. 5 is a block diagram of the device for generating a prompt message according to another exemplary embodiment of the present disclosure.

FIG. 5 is a block diagram of a device 500 for generating a prompt message according to another exemplary embodiment. The device 500 for generating a prompt message may be a portion or all of the electronic equipment 120 as shown in FIG. 1. The device 500 for generating a prompt message may include a first acquiring module 501, a second acquiring module 502, and a generating module 503.

The first acquiring module 501 is configured to acquire information about an opened-or-closed state of a door or window.

The second acquiring module 502 is configured to acquire the information about indoor and outdoor environments.

The generating module 503 is configured to generate the prompt message according to the information about the opened-or-closed state of the door or window and the information about the indoor and outdoor environments.

In some embodiments, the generating module 503 may include a determining sub-module 503A, a detecting sub-module 503B, and a generating sub-module 503C.

The determining sub-module 503A is configured to determine a correct opened-or-closed state for the door or window according to the information about the indoor and outdoor environments.

The detecting sub-module 503B is configured to detect whether the opened-or-closed state of the door or window is consistent with the correct opened-or-closed state.

The generating sub-module 503C is configured to, when the opened-or-closed state of the door or window is different from the correct opened-or-closed state, generate the prompt message according to the correct opened-or-closed state.

In some embodiments, the determining sub-module 503A may include a first detecting sub-module 503A1 and a first determining sub-module 503A2.

The first detecting sub-module 503A1 is configured to detect whether the outdoor environment quality is better than the indoor environment quality according to the information about the indoor and outdoor environments.

The first determining sub-module 503A2 is configured to, when the outdoor environment quality is better than the indoor environment quality, determine that the correct opened-or-closed state is an opened state, or when the indoor environment quality is better than the outdoor environment quality, determine that the correct opened-or-closed state is a closed state.

In some embodiments, the determining sub-module 503A may include a first acquiring sub-module 503A3 and a second determining sub-module 503A4.

The first acquiring sub-module 503A3 is configured to acquire the working state information of a specified device which is included in the information about the indoor and outdoor environments.

The second determining sub-module 503A4 is configured to, when the working state information indicates that the specified device is in a running state, determine that the correct opened-or-closed state is a closed state, or when the working state information indicates that the specified device is in the off state, determine that the correct opened-or-closed state is an opened state.

The specified device may include an air purifier, a refrigerating unit or a heating unit.

In some embodiments, the determining sub-module 503A may further include a second acquiring sub-module 503A5, a second detecting sub-module 503A6, and a third determining sub-module 503A7.

The second acquiring sub-module 503A5 is configured to acquire information of harmful indoor gas content which may be included in the information about the indoor and outdoor environments.

The second detecting sub-module 503A6 is configured to detect whether the harmful indoor gas content exceeds a preset threshold.

The third determining sub-module 503A7 is configured to, when the harmful indoor gas content exceeds the preset threshold, determine that the correct opened-or-closed state is an opened state.

In some embodiments, the device 500 may further include a sending module 504 configured to send the prompt message to a mobile terminal.

In some embodiments, the sending module 504 may include a third acquiring sub-module 504A and a sending sub-module 504B.

The third acquiring sub-module 504A is configured to acquire the state information of the mobile terminal. The state information includes at least one of information about an on-or-off state of the mobile terminal or information about geographic location of the mobile terminal.

The sending sub-module 504B is configured to send the prompt message to the mobile terminal according to the state information.

In some embodiments, the sending sub-module 504B may include a first sending sub-module 504B1, a second sending sub-module 504B2, and a third sending sub-module 504B3.

The first sending sub-module 504B1 is configured to send the prompt message to the mobile terminal that is in the on state according to the information about the on-or-off state.

The second sending sub-module 504B2 is configured to send the prompt message to the mobile terminal that is in the on state and is located the nearest to the door or window according to the information about the on-or-off state and the information about the geographic location.

The third sending sub-module 504B3 is configured to send the prompt message to the mobile terminal which is entering or leaving a predetermined area around the door or window according to the information about the geographic location.

In some embodiments, the device 500 may further include a controlling module 505, configured to control the opened-or-closed state of the door or window. The opened-or-closed state may include at least one of whether the door or window is open, a manner by which the door or window is opened, or an open angle of the door or window.

In some embodiments, the controlling module 505 may include a first controlling sub-module 505A and a second controlling sub-module 505B.

The first controlling sub-module 505A is configured to control the door or window to open or close automatically without the user feedback information, according to the prompt message.

The second controlling sub-module 505B is configured to receive feedback information which is sent by the mobile terminal in response to the received the prompt message, and control the door or window to be opened or closed according to the feedback information.

In the illustrated embodiment, the device 500 acquires the information about the opened-or-closed state of the door or window, acquires the information about indoor and outdoor environments, and generates the prompt message according to the information about the opened-or-closed state of the door or window and the information about the indoor and outdoor environments. As explained above, when the door or window are opened or closed unreasonably, an indoor air condition becomes poor, which affects the health of user. The embodiments of the present disclosure can remind the user to reasonably open or close the door or window according to the condition of indoor and outdoor environments, thereby not only improving the indoor air quality, but also preventing theft and protecting the security of user.

In the illustrated embodiments, the device 500 detects whether the outdoor environment quality is better than the indoor environment quality, reminds the user to open the door or window when the outdoor environment quality is better than the indoor environment quality, and reminds the user to close the door or window when the indoor environment quality is better than the outdoor environment quality. The device 500 may prevent that when the outdoor environment is relatively bad, the indoor environment is polluted because of opening the door or window, and generate an accurate prompt message.

The device 500 also determines whether to open the door or window according to the working state of the specified device. The device 500 prevents that when the user is using the specified device, the power resource is wasted because opening the door or window reduces the working efficiency of the specified device, and save the power resource.

The device 500 further detects whether the harmful indoor gas content exceeds the preset threshold, and reminds the user to open the door or window when the harmful indoor gas content exceeds the preset threshold to keep the indoor air in good quality.

The device 500 further sends the prompt message to the mobile terminal that is in the on state or the mobile terminal that is in the on state and located the nearest to the door or window so that the user can be reminded to open or close the door or window in time.

The details of executing operations by each module of the devices 400 and 500 have been described in detail in connection with the method 200 and 300 and will not be described here.

Figure 6:
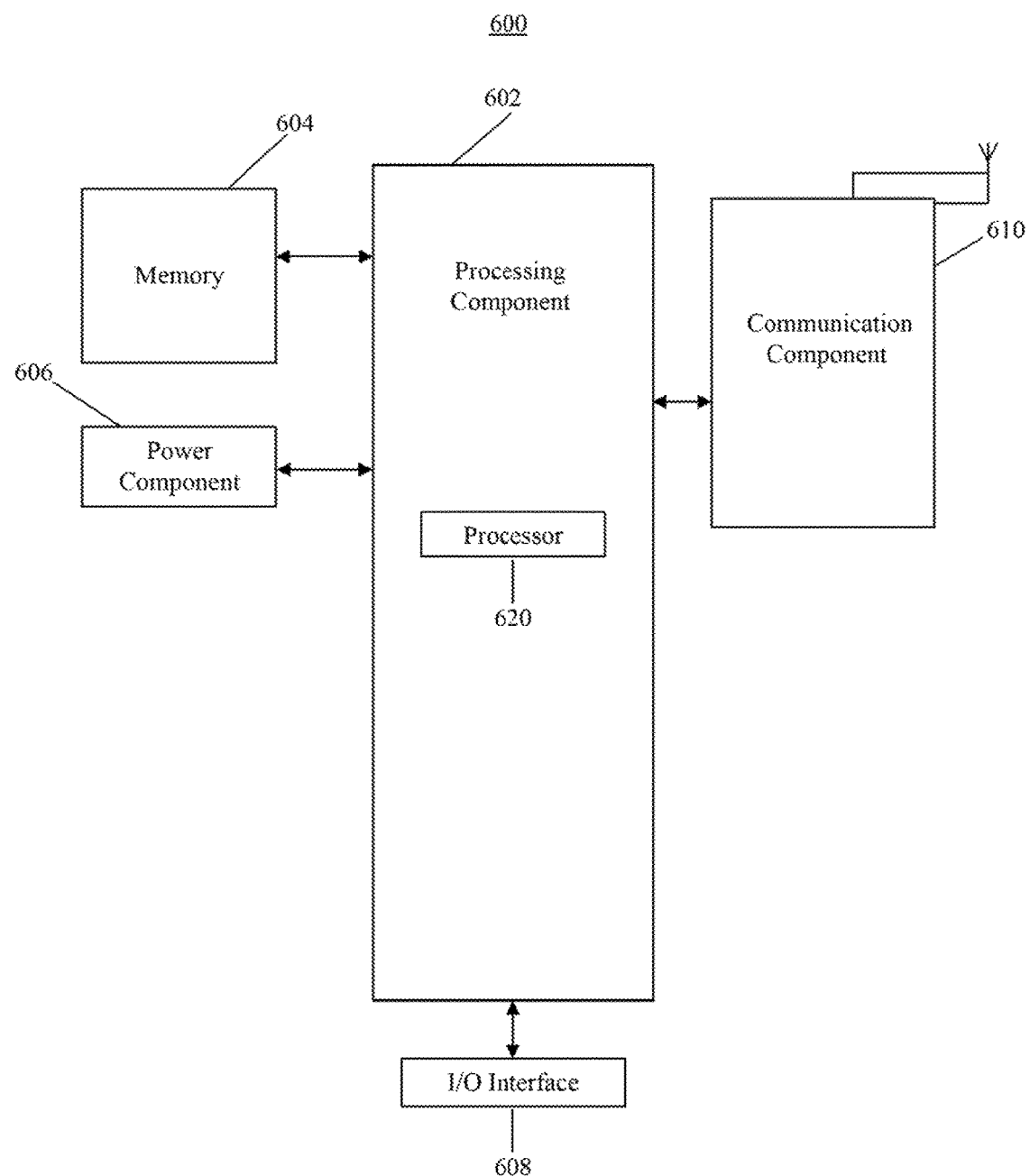
FIG. 6 is a block diagram of a device for generating a prompt message according to an exemplary embodiment of the present disclosure.

FIG. 6 is a block diagram of a device 600 for generating a prompt message according to an exemplary embodiment. The device 600 may be a smart phone, a smart television, a tablet computer, an intelligent router, a laptop computer, and so on. This embodiment is illustrated by using the intelligent router as device 600. However, the present disclosure is not so limited.

With reference to FIG. 6, the device 600 may include one or more of the following components: a processing component 602, a memory 604, a power component 606, an Input/Output (I/O) interface 608, and a communication component 610.

The processing component 602 typically controls overall operations of the device 600. The processing component 602 may include one or more processors 620 to execute instructions to perform all or part of steps in the above described method. Moreover, the processing component 602 may include one or more modules which facilitate the interaction between the processing component 602 and other components.

The memory 604 is configured to store various types of data to support the operation of the device 600. Examples of these data include instructions for any application or method operated on the device 600. The memory 604 may be implemented using any volatile or any non-volatile storage device, or a combination thereof, such as a Static Random Access Memory (SRAM), an Electrically Erasable Programmable Read-Only Memory (EEPROM), an Erasable Programmable Read Only Memory (EPROM), a Programmable Read Only Memory (PROM), a Read-Only Memory (ROM), a magnetic memory, a flash memory, a disk or a compact disc.

The power component 606 provides power to various components of the device 600. The power component 606 may include a power management system, one or more power sources, and other components associated with generation, management and distribution of power in the device 600.

The I/O interface 608 provides an interface between the processing component 602 and peripheral interface modules.

The communication component 610 is configured to facilitate communication, wired or wirelessly, between the device 600 and other devices. In one exemplary embodiment, the communication component 610 receives a broadcast signal or broadcast associated information from an external broadcast management system via a broadcast channel. In one exemplary embodiment, the communication component 610 further includes a Near Field Communication (NFC) module to facilitate short-range communications. For example, the NFC module may be implemented based on a Radio Frequency Identification (RFID) technology, an Infrared Data Association (IrDA) technology, an Ultra Wide Band (UWB) technology, a Bluetooth (BT) technology, and other technologies.

In exemplary embodiments, the device 600 may be implemented with one or more Application Specific Integrated Circuits (ASICs), Digital Signal Processors (DSPs), Digital Signal Processing Devices (DSPDs), Programmable Logic Devices (PLDs), Field Programmable Gate Arrays (FPGAs), controllers, microcontrollers, microprocessors or other electronic components, for performing the above described methods.

In exemplary embodiments, there is also provided a non-transitory computer readable storage medium including instructions, such as included in the memory 604, executable by the processor 620 in the device 600, for performing the above-described methods 200 and 300. For example, the non-transitory computer readable storage medium may be a ROM, a Compact Disc Read Only Memory (CD-ROM), a magnetic tape, a floppy disc, an optical data storage device, and the like.

It is provided a non-transitory computer readable storage medium including instructions that, when executed by the processor of the device 600, cause the device 600 to perform the methods 200 and 300 for generating a prompt message.

Other embodiments of the disclosure will be apparent to those skilled in the art from consideration of the specification and practice of the invention disclosed here. This application is intended to cover any variations, uses, or adaptations of the invention following the general principles thereof and including such departures from the present disclosure as come within known or customary practice in the art. It is intended that the specification and examples be considered as exemplary only, with a true scope and spirit of the invention being indicated by the following claims.

It will be appreciated that the present invention is not limited to the exact construction that has been described above and illustrated in the accompanying drawings, and that various modifications and changes can be made without departing from the scope thereof. It is intended that the scope of the invention only be limited by the appended claims.

What is claimed is:

1. A method for generating a prompt message, comprising:
    acquiring information about an opened-or-closed state of a door or window, the information about the opened-or-closed state of a door or window indicating whether the door or window is in an opened or closed state;
    acquiring information about indoor and outdoor environments; generating a prompt message according to the information about the opened-or-closed state of the door or window and the information about the indoor and outdoor environments; and
    performing at least one of:
    sending the prompt message to a mobile terminal that is in an on state and is located nearest to the door or window, according to information about an on-or-off state of the mobile terminal and information about a geographic location of the mobile terminal; or
    sending the prompt message to a mobile terminal that is entering or leaving a predetermined area around the door or window, according to information about a geographic location of the mobile terminal.

2. The method according to claim 1, wherein the generating the prompt message according to the information about the opened-or-closed state of the door or window and the information about the indoor and outdoor environments comprises:
    determining a correct opened-or-closed state of the door or window according to the information about the indoor and outdoor environments;
    detecting whether the opened-or-closed state of the door or window is consistent with the correct opened-or-closed state; and
    if the opened-or-closed state of the door or window is different from the correct opened-or-closed state, generating the prompt message according to the correct opened-or-closed state.

3. The method according to claim 2, wherein the determining the correct opened-or-closed state of the door or window according to the information about the indoor and outdoor environments comprises:
    detecting whether outdoor environment quality is better than indoor environment quality according to the information about the indoor and outdoor environments;
    if the outdoor environment quality is better than the indoor environment quality, determining that the correct opened-or-closed state is an opened state; and
    if the indoor environment quality is better than the outdoor environment quality, determining that the correct opened-or-closed state is a closed state.

4. The method according to claim 2, wherein the determining the correct opened-or-closed state of the door or window according to the information about the indoor and outdoor environments comprises:
    acquiring information of whether a specified device is in a working state, the working state information being included in the information about the indoor and outdoor environments;
    if the working state information indicates that the specified device is in a running state, determining that the correct opened-or-closed state is a closed state; and
    if the working state information indicates that the specified device is in an off state, determining that the correct opened-or-closed state is an opened state.

5. The method according to claim 2, wherein the determining the correct opened-or-closed state of the door or window according to the information about the indoor and outdoor environments comprises:
    acquiring harmful indoor gas content, which is included in the information about the indoor and outdoor environments;
    detecting whether the harmful indoor gas content exceeds a preset threshold; and
    if the harmful indoor gas content exceeds the preset threshold, determining that the correct opened-or-closed state is an opened state.

6. The method according to claim 1, further comprising:
    controlling the opened-or-closed state of the door or window, wherein the opened-or-closed state comprises at least one of the following: opening or closing the door or window, a manner by which the door or window is opened, or an open angle of the door or window.

7. The method according to claim 6, wherein the controlling the opened-or-closed state of the door or window comprises one of:
    opening or closing the door or window according to the prompt message; or
    receiving feedback information which is sent by the mobile terminal in response to the prompt message, and opening or closing the door or window according to the feedback information.

8. A device for generating a prompt message, comprising:
    a processor; and
    a memory for storing instructions executable by the processor,
    wherein the processor is configured to:
    acquire information about an opened-or-closed state of a door or window, the information about the opened-or-closed state of a door or window indicating whether the door or window is in an opened or closed state;
    acquire information about indoor and outdoor environments;
    generate a prompt message according to the information about the opened-or-closed state of the door or window and the information about the indoor and outdoor environments; and
    perform at least one of:
    sending the prompt message to a mobile terminal that is in an on state and is located nearest to the door or window, according to information about an on-or-off state of the mobile terminal and information about a geographic location of the mobile terminal; or
    sending the prompt message to a mobile terminal that is entering or leaving a predetermined area around the door or window, according to information about a geographic location of the mobile terminal.

9. The device according to claim 8, wherein, in generating the prompt message according to the information about the opened-or-closed state of the door or window and the information about the indoor and outdoor environments, the processor is further configured to:
- determine a correct opened-or-closed state of the door or window according to the information about the indoor and outdoor environments;
- determine whether the opened-or-closed state of the door or window is consistent with the correct opened-or-closed state; and
- if the opened-or-closed state of the door or window is different from the correct opened-or-closed state, generate the prompt message according to the correct opened-or-closed state.

10. The device according to claim 9, wherein, in determining the correct opened-or-closed state of the door or window according to the information about the indoor and outdoor environments, the processor is further configured to:
- determine whether outdoor environment quality is better than indoor environment quality according to the information about the indoor and outdoor environments;
- if the outdoor environment quality is better than the indoor environment quality, determine that the correct opened-or-closed state is an opened state; or if the indoor environment quality is better than the outdoor environment quality, determine that the correct opened-or-closed state is a closed state.

11. The device according to claim 9, wherein, in determining the correct opened-or-closed state of the door or window according to the information about the indoor and outdoor environments, the processor is further configured to:
- acquire information of whether a specified device is in a working state, the working state information being included in the information about the indoor and outdoor environments;
- if the working state information indicates that the specified device is in a running state, determine that the correct opened-or-closed state is a closed state; and
- if the working state information indicates that the specified device is in an off state, determine that the correct opened-or-closed state is an opened state.

12. The device according to claim 9, wherein, in determining the correct opened-or-closed state of the door or window according to the information about the indoor and outdoor environments, the processor is further configured to:
- acquire information of harmful indoor gas content, which is included in the information about the indoor and outdoor environments;
- determine whether the harmful indoor gas content exceeds a preset threshold; and
- if the harmful indoor gas content exceeds the preset threshold, determine that the correct opened-or-closed state is an opened state.

13. The device according to claim 8, wherein the processor is further configured to:
- control the opened-or-closed state of the door or window, wherein the opened-or-closed state comprises at least one of the following: opening or closing the door or window, a manner by which the door or window is opened, or an open angle of the door or window.

14. A non-transitory computer-readable storage medium having stored therein instructions that, when executed by a processor, cause the processor to perform a method for generating a prompt message, the method comprising:
- acquiring information about an opened-or-closed state of a door or window, the information about the opened-or-closed state of a door or window indicating whether the door or window is in an opened or closed state;
- acquiring information about indoor and outdoor environments;
- generating a prompt message according to the information about the opened-or-closed state of the door or window and the information about the indoor and outdoor environments; and
- performing at least one of:
- sending the prompt message to a mobile terminal that is in an on state and is located nearest to the door or window, according to information about an on-or-off state of the mobile terminal and information about a geographic location of the mobile terminal; or
- sending the prompt message to a mobile terminal that is entering or leaving a predetermined area around the door or window, according to information about a geographic location of the mobile terminal.

* * * * *